United States Patent
Furlong et al.

(10) Patent No.: US 9,360,252 B2
(45) Date of Patent: Jun. 7, 2016

(54) PROCESS AND APPARATUS FOR REMOVING HEAT AND WATER FROM FLUE GAS

(75) Inventors: Steve Furlong, Mississauga (CA); Ian R. McGregor, Mississauga (CA); Christopher H. Belchers, Oakville (CA)

(73) Assignee: Drystill Holdings Inc., Mississauga (CA)

( * ) Notice: Subject to any disclaimer, the term of this patent is extended or adjusted under 35 U.S.C. 154(b) by 435 days.

(21) Appl. No.: 14/004,047

(22) PCT Filed: Mar. 7, 2012

(86) PCT No.: PCT/CA2012/000209
§ 371 (c)(1),
(2), (4) Date: Jan. 17, 2014

(87) PCT Pub. No.: WO2012/119235
PCT Pub. Date: Sep. 13, 2012

(65) Prior Publication Data
US 2014/0150493 A1 Jun. 5, 2014

Related U.S. Application Data

(60) Provisional application No. 61/450,405, filed on Mar. 8, 2011, provisional application No. 61/450,923, filed on Mar. 9, 2011.

(51) Int. Cl.
*B01D 53/14* (2006.01)
*B01D 53/26* (2006.01)
(Continued)

(52) U.S. Cl.
CPC ............... *F25J 3/08* (2013.01); *B01D 53/263* (2013.01); *F23G 7/02* (2013.01); *F23J 15/006* (2013.01);
(Continued)

(58) Field of Classification Search
CPC ............ B01D 53/1425; B01D 53/263; B01D 2252/10; B01D 2258/0283; F23G 7/02; F23J 15/006; F23J 15/04; F23J 15/06; F25J 3/08; Y02E 20/363
USPC ........... 95/187, 188, 206, 210, 211, 227, 228, 95/231; 96/290, 295
See application file for complete search history.

(56) References Cited

U.S. PATENT DOCUMENTS

| 3,261,766 A | 7/1966 | Sherwood |
| 4,539,076 A | 9/1985 | Swain |
| 7,390,353 B2 | 6/2008 | Deen et al. |

(Continued)

FOREIGN PATENT DOCUMENTS

| CN | 101331081 A | 12/2008 |
| GB | 1240072 A | 7/1971 |

(Continued)

*Primary Examiner* — Frank Lawrence
(74) *Attorney, Agent, or Firm* — Dinsmore & Shohl LLP (57) ABSTRACT

Disclosed is a process for use with flue gas having a moisture content M. The flue gas is introduced to strong brine adapted to exothermically absorb moisture. Simultaneously, heat is withdrawn. This produces heat, water-enriched brine and a gas having a moisture concentration less than M. The strong brine can be recovered by distillation from enriched brine to produce water. The brine temperature throughout absorption can remain within 2° F. of a temperature T in the range 220° F.-300° F. The heat withdrawal can be associated with gas-liquid phase change of a working fluid. The terminus of the heat flow can be associated with gas-liquid phase change of the working fluid. The working fluid can: as liquid, flow only by gravity, convection or wicking; and, as gas, flow only by diffusion or convection. The heat flow can drive a boiler producing steam. M can be greater than 15 wt. % water.

19 Claims, 7 Drawing Sheets

(51) Int. Cl.
    *F25J 3/08*    (2006.01)
    *F23J 15/00*   (2006.01)
    *F23J 15/04*   (2006.01)
    *F23J 15/06*   (2006.01)
    *F23G 7/02*    (2006.01)

(52) U.S. Cl.
    CPC   *F23J 15/04* (2013.01); *F23J 15/06* (2013.01); *B01D 53/1425* (2013.01); *B01D 2252/10* (2013.01); *B01D 2258/0283* (2013.01); *Y02E 20/363* (2013.01)

(56) References Cited

U.S. PATENT DOCUMENTS

| | | | |
|---|---|---|---|
| 2007/0012187 A1* | 1/2007 | Deen | B01D 53/263 D53/263 |
| 2009/0095162 A1* | 4/2009 | Hargis | B01D 53/263 D53/263 |

FOREIGN PATENT DOCUMENTS

| | | |
|---|---|---|
| JP | 2008200626 A | 9/2008 |
| WO | 0041462 A2 | 7/2000 |
| WO | 2010121374 A1 | 10/2010 |

\* cited by examiner

PROCESS AND APPARATUS FOR REMOVING HEAT AND WATER FROM FLUE GAS

CROSS-REFERENCE TO RELATED APPLICATIONS

This application is the U.S. National Phase of PCT Application PCT/CA2012/000209 which claims the benefit of U.S. Provisional Application 61/450,405 filed on Mar. 8, 2011 and claims the benefit of U.S. Provisional Application 61/450,923 filed on Mar. 9, 2011.

FIELD OF THE INVENTION

The present invention relates to the field of conservation.

BACKGROUND OF THE INVENTION

It is widely recognized that flue gases often contain heat and water. It is known to extract water from flue gas in water-constrained environments, for example, in the context of a desert-situated fossil-fuel-fired power plant. It is also known to extract heat from flue gas, for example, to pre-heat boiler feed make-up water. However, often only relatively modest amounts of heat can be extracted from flue gases using conventional technologies; if excess heat is extracted, condensation can occur, leading in many applications to the possibility of undesirable corrosion. As well, because of the relatively wide availability of water in areas where flue gases are likely to be found, i.e. inhabited areas, the recovery of water from flue gas using known processes is rarely economic.

SUMMARY OF THE INVENTION

Forming one aspect of the invention is a process for use with a relatively moist flue gas. The process comprises the steps of:
i. simultaneously
   introducing said moist flue gas to a flow of brine, said brine being adapted to exothermically absorb moisture from the flue gas to produce heat; and
   withdrawing heat,
   thereby to produce a flow of heat, a flow of water-enriched brine and a relatively dry flue gas; and
ii. recovering the brine from the water-enriched brine to produce a flow of water.
The process is characterized in that:
the temperature of the brine throughout the heat withdrawal step remains within 2° F. of a fixed temperature that lies in the range 220° F.-300° F.; and/or
the withdrawal of heat is associated with the phase change of a working fluid from the liquid state to a gaseous state; the terminus of the heat flow is associated with the phase change of the working fluid from the gaseous state to the liquid state; in the liquid state, the working fluid flows only by one or more of gravity, convection and wicking; and in the gaseous state, the working fluid flows only by one or more of diffusion and convection; and/or
the flow of heat directly drives a boiler to produce positive pressure steam; and/or
the water concentration of the moist flue gas is greater than 12 wt. %; and/or
the brine is recovered through multiple-effect distillation of the water-enriched brine.

In the process:
the working fluid can be contained within a plurality of heat pipes;
the heat pipes can operate in use as a packed absorption column;
the water-enriched brine can be in vapor-liquid equilibrium with the relatively moist flue gas;
the brine can be in vapor-liquid equilibrium with the relatively dry flue gas; and
the process can be used with a flue gas that originates from a DDGS dryer and is delivered via a thermal oxidizer.

Forming another aspect of the invention is apparatus for use with a flue gas, a supply of liquid and a flow of brine, the brine being adapted to exothermically absorb moisture from the flue gas to produce heat.

The apparatus comprises: a flue; a vessel which, in use, receives liquid from said supply and which has an interior including a headspace, the vessel being disposed within the flue in spaced relation to define a flow channel between the vessel and the flue and through which the flue gas passes in use; a distributor which, in use, receives the brine and channels same to the flow channel; a plurality of heat pipes each leading between the flow channel and the interior of the vessel, the surfaces of the heat pipes operating in use in the manner of packing in a packed absorption column, thereby to facilitate the absorption of moisture from the flue gas and the generation of heat and weak brine, the heat pipes further withdrawing heat from the flow channel and delivering same to the liquid in the vessel to produce gas; a conduit for venting the gas from the headspace of the vessel; a collector for collecting the weak brine; and a regenerator for receiving the weak brine, regenerating the brine and producing a flow of water.

In the apparatus:
the collector can be defined by a reservoir and the flue can include a stack extending vertically from the collector, the stack being defined by an annular wall having an inlet defined therethrough for receiving the flue gas;
the vessel can be an obround with vertical sides and be disposed in concentric relation to the stack;
the plurality of heat pipes can be arranged in layers, the heat pipes in each layer collectively defining a grid;
each heat pipe can have the shape of an ogee;
each grid can have the shape of a frustum of an onion dome, the onion dome being of the type having a bulbous lower part defined by a convex surface and an upper part having a concave surface that tapers to an apex, the horizontal planes defining the frustum lying, respectively, between widest part of the lower part and the transition of the lower and upper parts; and between the transition of the lower and upper parts and the apex;
the vessel can project above and below the heat plurality of heat pipes.

Advantages, features and characteristics of the present invention will become apparent upon review of the following detailing description, with reference to the appended drawings, the latter being briefly described hereinafter.

DETAILED DESCRIPTION OF THE EXEMPLARY EMBODIMENTS

Reference is now made to FIGS. 1-7 which show the above-noted exemplary embodiments.

Figure 1:
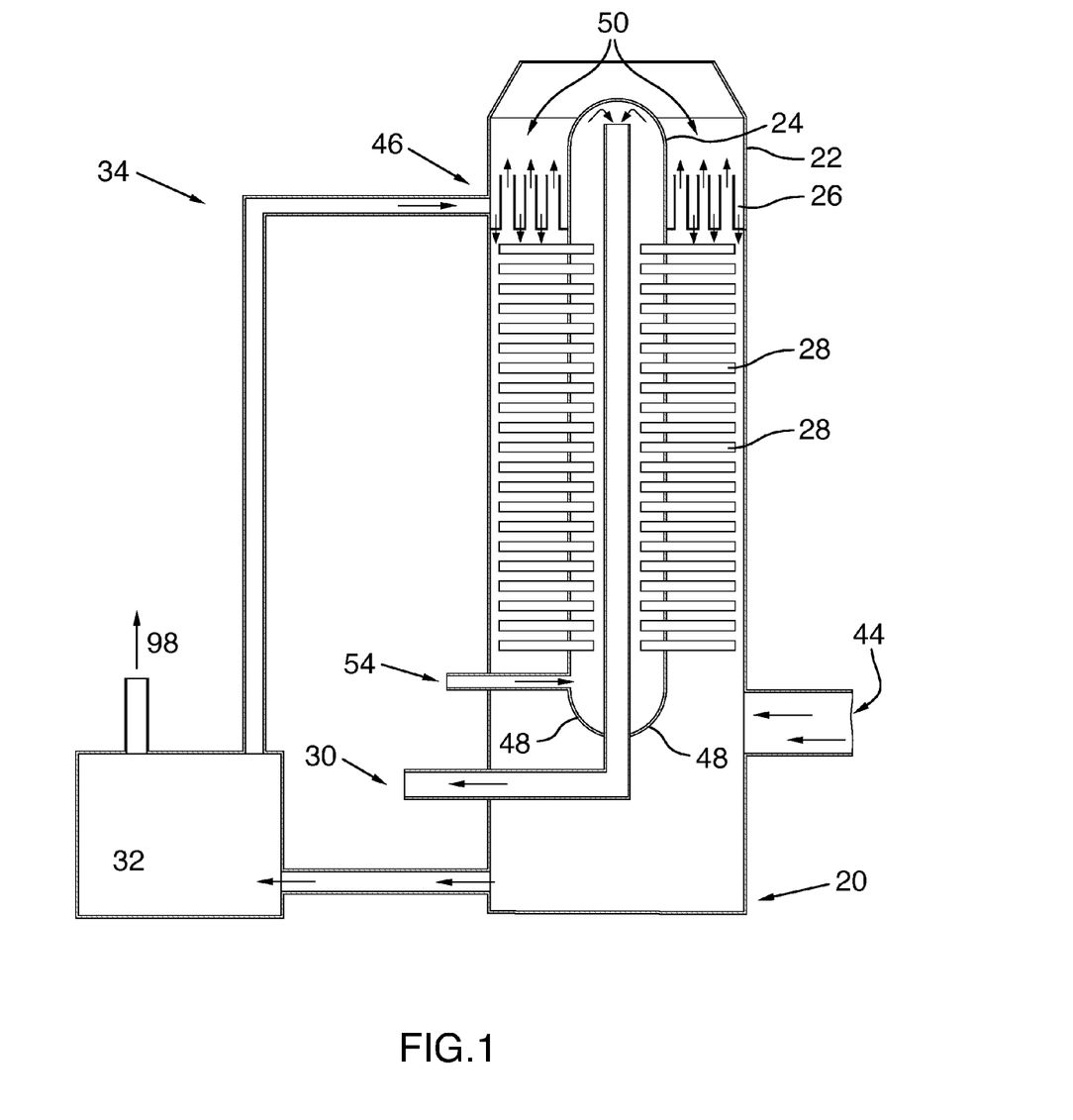
FIG. 1 is a schematic view of apparatus according to an exemplary embodiment of the invention.
Figure 2:
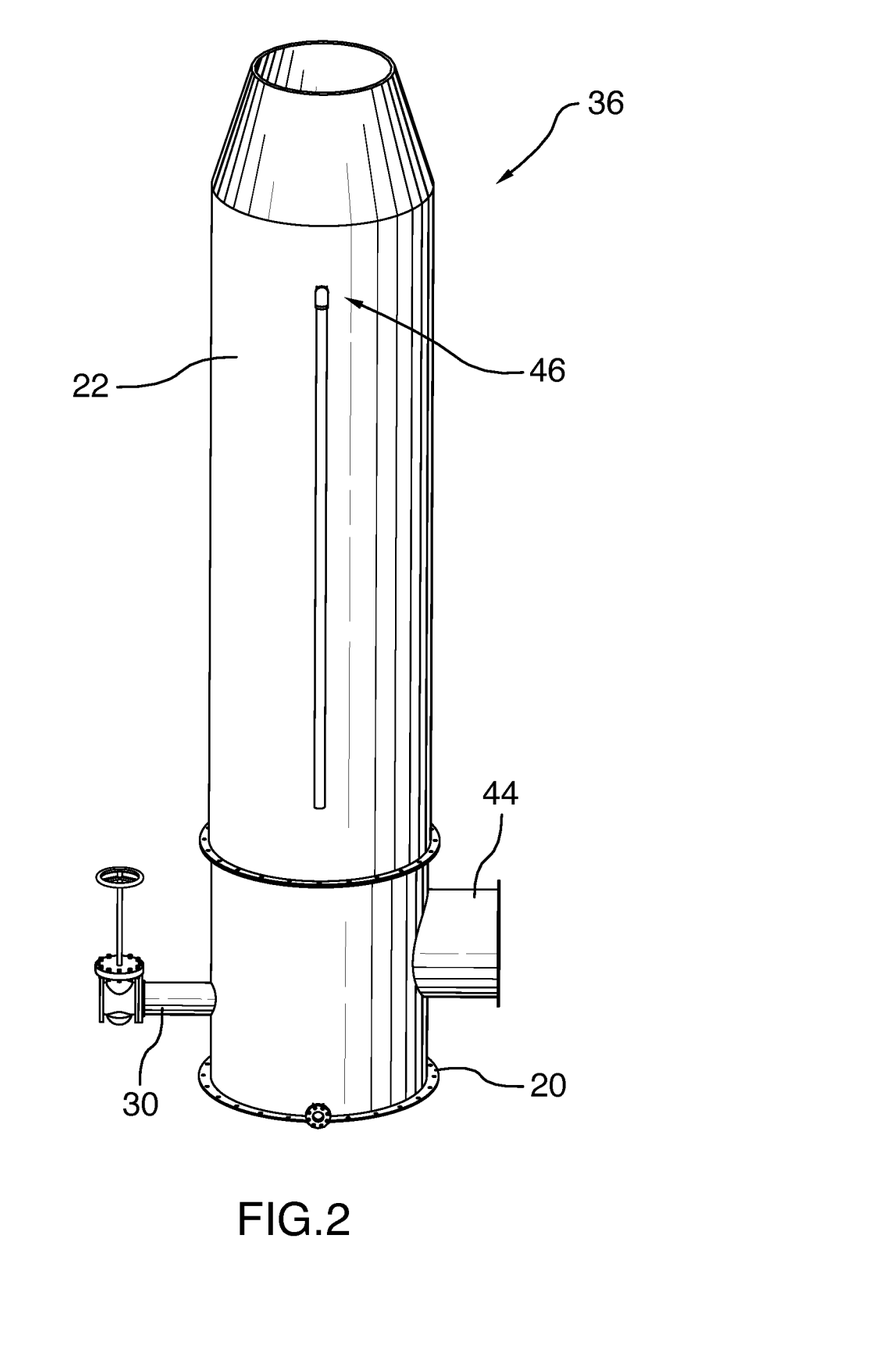
FIG. 2 is a perspective view of the structure of the exemplary embodiment
Figure 3:
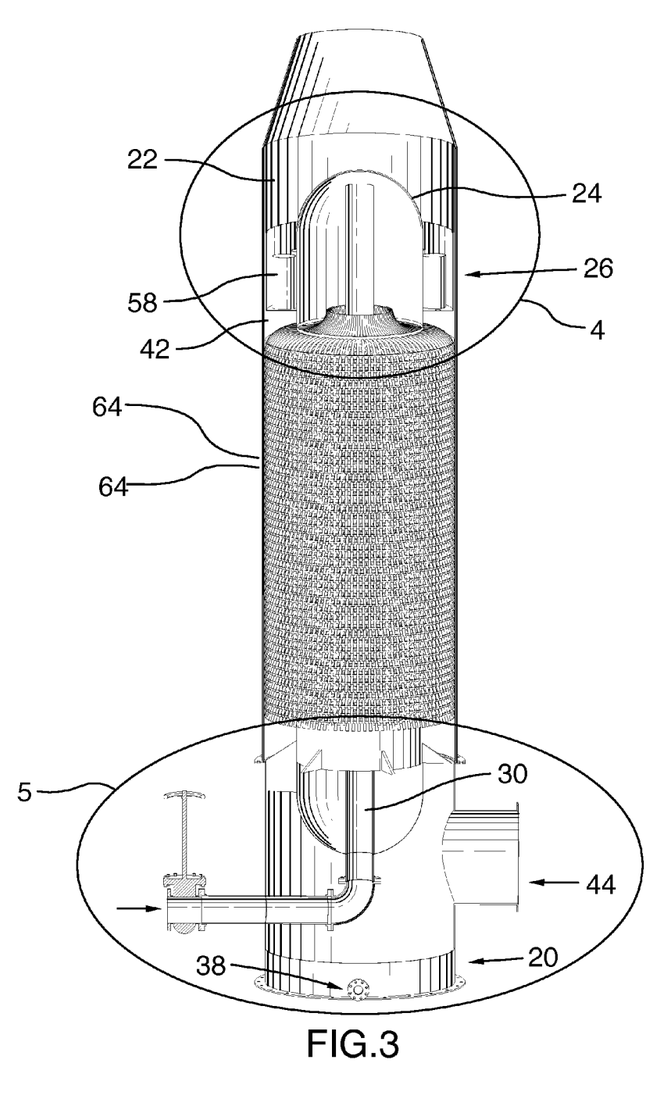
FIG. 3 is a view of the structure of FIG. 2 with the flue illustrated in phantom lines to show the interior.
Figure 4:
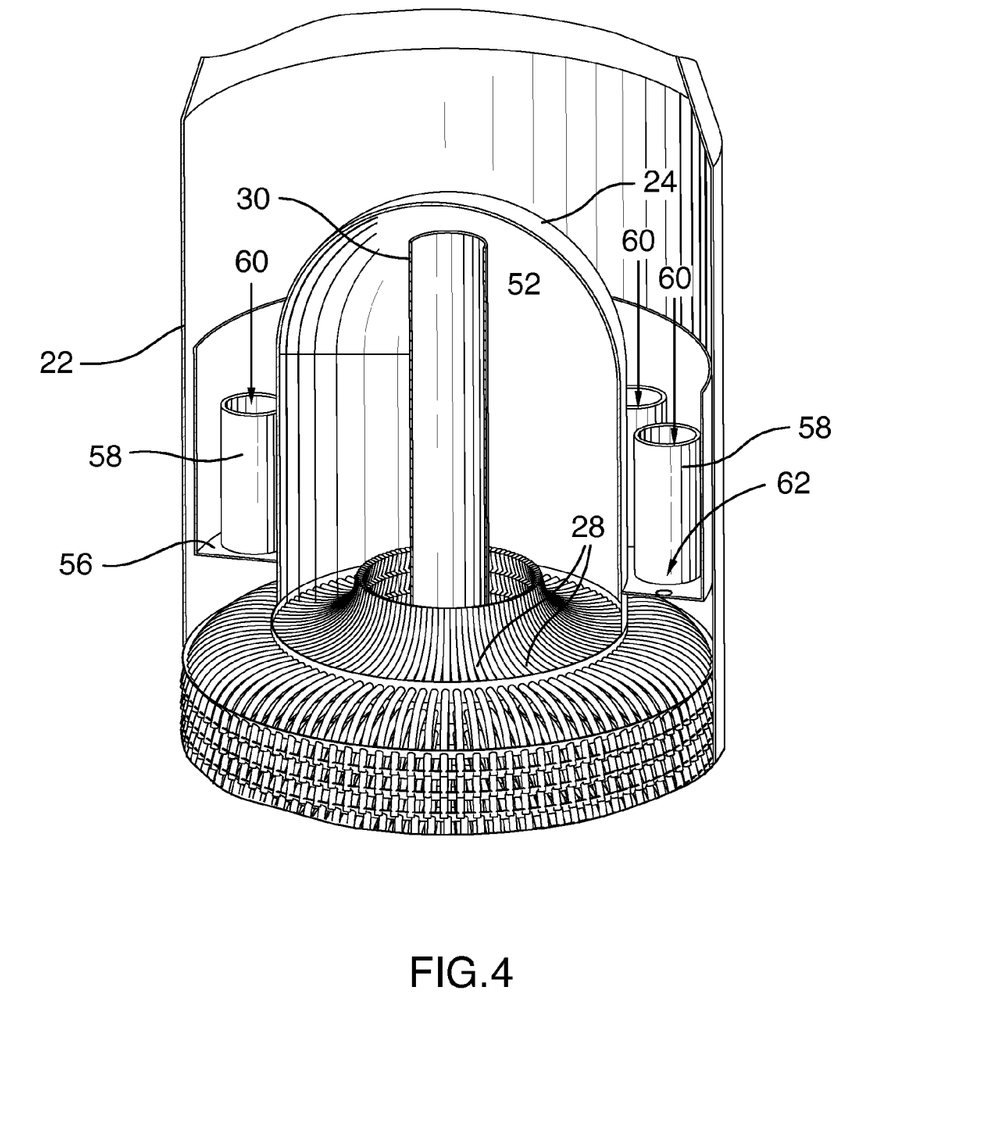
FIG. 4 is an enlarged view of encircled area 4 of FIG. 3.
Figure 5:
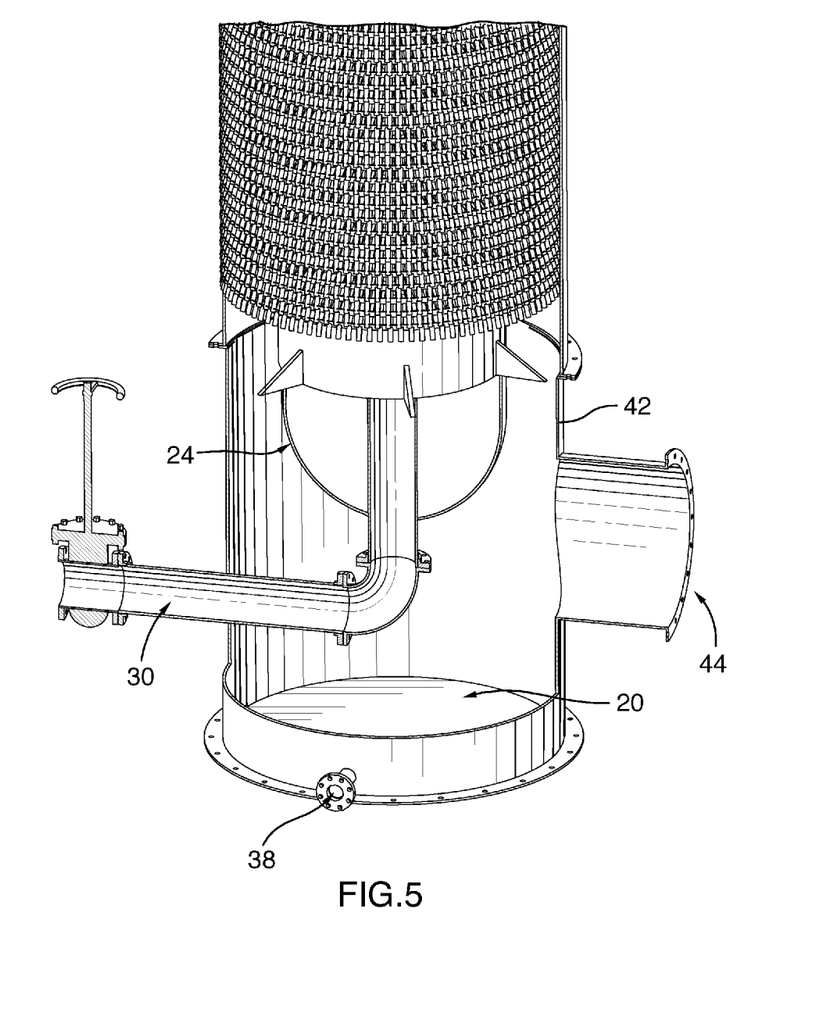
FIG. 5 is an enlarged view of encircled area 5 of FIG. 3.

With reference to FIG. 1, this shows, in schematic form, the collector 20, flue 22, vessel 24, distributor 26, plurality of heat pipes 28, conduit 30 and regenerator 32 which collectively form the exemplary apparatus 34 and have the functions indicated in the summary of the invention to be characteristic of the apparatus in all embodiments.

The reservoir 20, flue 22, vessel 24, distributor 26, plurality of heat pipes 28 and conduit 30, which collectively define a stripping absorption module 36, are shown in detail in FIGS. 2-6. In this document, the stripping absorption module is sometimes referenced as a SAM.

Herein, it will be seen that this collector 20 takes the form herein of a shallow dish-shaped reservoir having a drain 38.

This flue 22 will be seen to include a stack extending vertically from the collector 20, the stack 40 being defined by an annular wall 42 which forms an extension of the collector 20 and which has a gas inlet 44 defined therethrough adjacent the collector 20 and further has a a brine inlet 46 therethrough adjacent the top of the stack.

This vessel 24 is an obround with vertical sides 48 and is disposed in concentric, spaced relation to the stack to define a flow channel 50 between the vessel 24 and the stack. Interior of the vessel 24 is a headspace 52. A liquid inlet 54 is provided near the base of the vessel 24, as indicated in FIG. 1.

This distributor 26 is defined by a plate 56 and a plurality of chimneys 58. The plate 56 is annular and is disposed proximal to the top of the vessel 24 and beneath the brine inlet 46 to occlude the flow channel 50. The chimneys 58 each extend upwardly from the plate 56, to a height above the brine inlet 46. At the base of each chimney 58 is a gas passage 60 that extends through the plate 56. The surface of the plate 56 between the chimneys 58 is provided with perforations 62, to provide for fluid communication across the plate 56.

The heat pipes 28 are of the conventional type, i.e. each pipe 28 is a partially evacuated tube used for heat transfer and containing a working fluid. At the hot interface within a heat pipe, the working fluid, which is in liquid form, contacts a thermally conductive solid surface and turns into a vapor by absorbing heat from that surface. The vapor flows by one or more of diffusion and convection to a cold interface in the heat pipe, whereat it condenses back into a liquid, releasing the latent heat. The liquid then returns to the hot interface through either capillary action, wicking or gravity action where it evaporates once more and repeats the cycle.

These heat pipes 28 are arranged in layers 64, with each heat pipe 28 leading between the flow channel 50 and the interior of the vessel 24 and having the shape of the ogee, and the heat pipes 28 in each layer collectively defining a grid 66.

Figure 6:
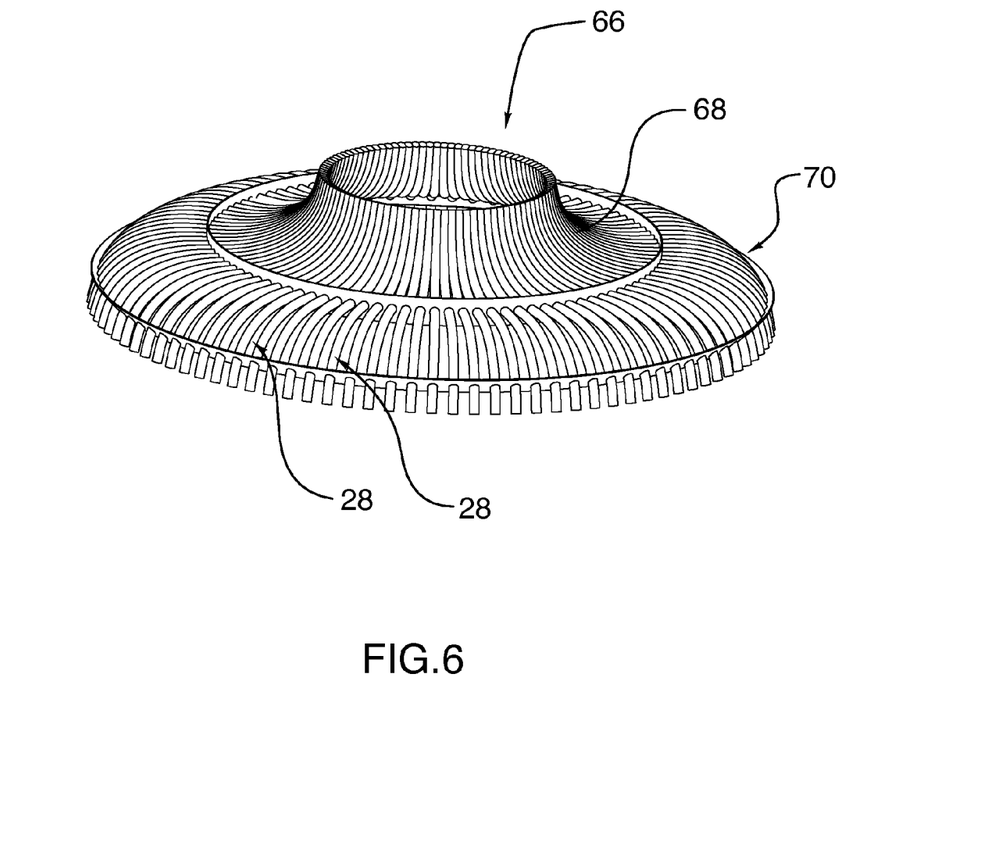
FIG. 6 is an enlarged view of a portion of FIG. 4, showing the grid of the exemplary embodiment in isolation.

As best seen in FIG. 6, each grid 66 has the general shape of a frustum of an onion dome
- the onion dome being of the architectural type [not shown] having a bulbous lower part defined by a convex surface and an upper part having a concave surface that tapers to an apex; and
- the horizontal planes defining the frustum lying, respectively, between widest part of the lower part and the transition of the lower and upper parts; and between the transition of the lower and upper parts and the apex.

Although an onion dome is not shown, the portions of the grids that correspond to the upper part and lower part are indicated, respectively, by reference numerals 68,70 in FIG. 6

The arrangement of the heat pipes 28 is such that the vessel 24 projects above and below the plurality of heat pipes 28.

This conduit 30 extends through the sidewall 42 of the stack, proximal to the collector 20, thence upwardly through the base of the vessel 24, and thence interiorly of the vessel 24 to the headspace 52.

It will be understood that this exemplary apparatus can be used with a moist feed gas, such as flue gas, with a supply of liquid and with a flow of strong brine adapted to exothermically absorb moisture from the feed gas to produce heat.

In use:
- the feed gas is directed into the flue 22 through the inlet 44;
- liquid from said supply is introduced into the vessel 24 via the liquid inlet 54;
- strong brine is introduced to the distributor 26 via the brine inlet 46;
- the strong brine passes through the perforations 62 to enter the flow channel 50 from the top thereof; contemporaneously, the feed gases enter the flow channel 50 via the bottom thereof;
- as the brine and feed gases pass one another in counterflow, the surfaces of the heat pipes 28 function in a manner analogous to packing in a packed absorption column, thereby to facilitate the absorption by the brine of moisture from the feed gas; this generates water-enriched brine and heat, the former being in vapor-liquid equilibrium with the flue gas and the latter being contemporaneously withdrawn from the flow channel 50 by the heat pipes 28 and delivered to liquid in the vessel 24 to produce process gas;
- the process gas produced interiorly of the vessel 24 travels to the vessel headspace 52 and is thence vented through the conduit 30;
- the water-enriched brine falls to the reservoir 20 and is directed to the regenerator 32 via the drain 38; and
- within the regenerator 32, the water-enriched brine is flashed to recreate the strong brine and produce a flow of water, indicated by arrow 98 in FIG. 1.

Figure 7:
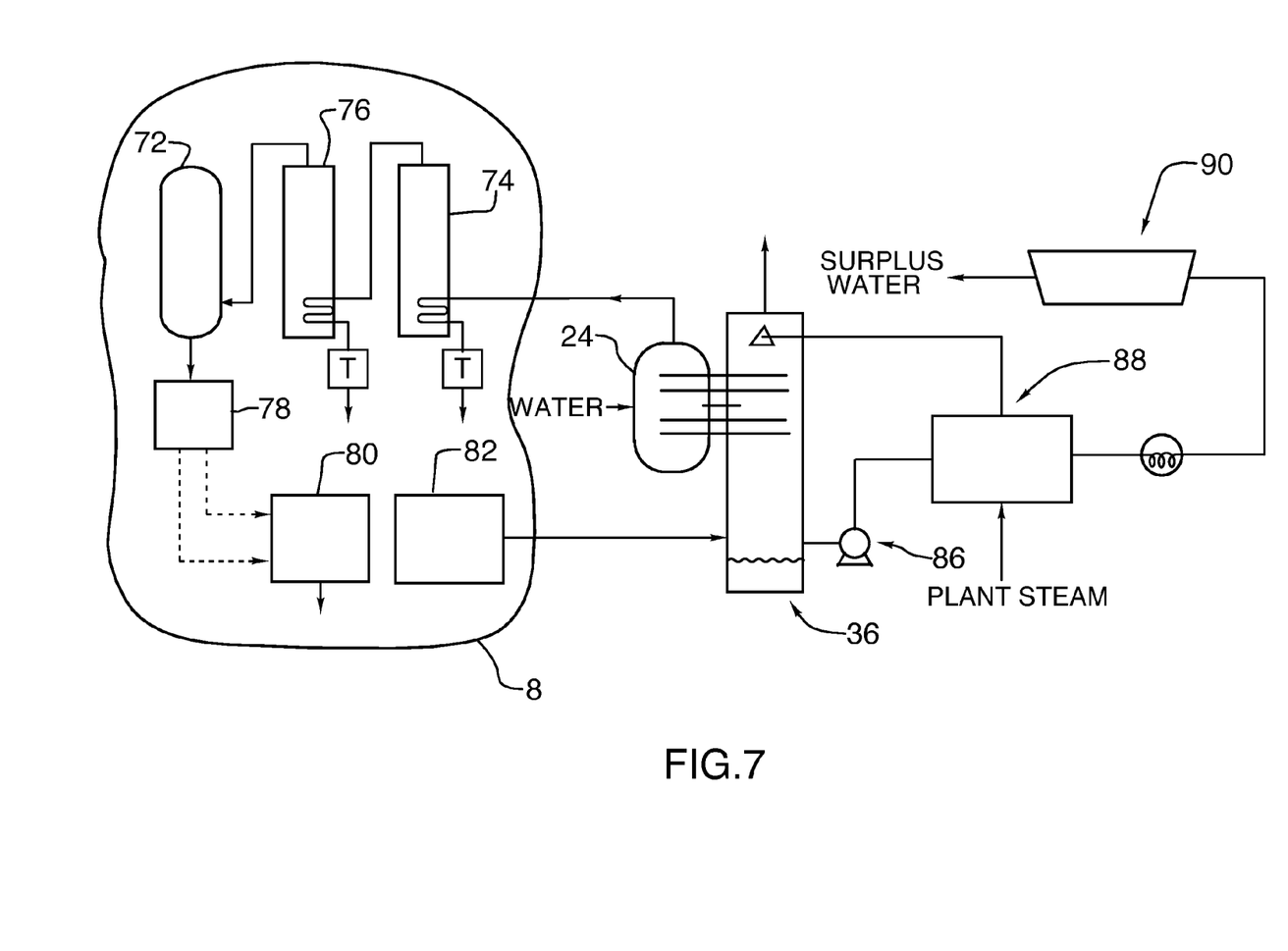
FIG. 7 is a schematic view showing an exemplary embodiment of the process.

Reference is now made to FIG. 7, which shows an exemplary use of the process and the apparatus.

Herein, portions of an ethanol plant are shown.

With initial reference to that portion of FIG. 7 within encircled area 8, namely, the beer column 72, distillation columns 74,76, dewatering facility 78, rotary drier 80 and thermal oxidizer 82, it will be understood that this structure is conventional.

In use, the distillation columns 74, 76 which form part of the ethanol refining system (not shown) are arranged, with the beer column 72, for multiple effect distillation, i.e. positive pressure stream is used to drive the first column 74; vapors from the first column 74 are used to drive the second column 76; and vapors from the second column 76 are used to drive the beer column 72. Whole stillage from the bottom of the beer column 72 is pumped to the dewatering facility 78 and separated into syrup and cake which is transferred to the rotary drier 80, to produce DDGS and offgas. The offgas passes through the oxidizer 82, to remove aromatics. In a conventional facility (not shown), fuel such as natural gas would be used to provide the positive pressure steam to the first column, and a condensing heat exchanger would be used to capture heat from flue gases exiting the thermal oxidizer. In the exemplary embodiment, this functionality is instead provided by the balance of FIG. 7, which will be understood to correspond generally to the structure of FIG. 1 and include a boiler vessel 24 operating at 225° F., a SAM 36 operating at 260° F., a pump 86, a multiple effect desorption unit 88 and an evaporative cooling tower 90. In use, 400° F. flue gas from the thermal oxidizer 82, which contains 40 wt. % water, is fed to the bottoms of the SAM 36 and 65% LiBr brine is fed to the distributor 26. The sensible heat of the flue gas, as well as the latent heat associated with the heat of absorption, is transferred via the heat pipes 28 to the boiler 24, to create 5 psig steam for first column 74. The 58 wt. % LiBr brine from the SAM 36 collector is desorbed in the multiple effect desorption unit 88 using plant steam, to recover the strong brine and produce low quality steam which is dewatered via the evaporative cooling facility 90. About 5,500 BTU/gal in plant steam is required to fire desorption unit 88, which generates about 10,400 BTU/gal in 5 psig steam, leading to net savings of 4,900 BTU/gal ethanol produced. In this application, about 0.33 gallons of water are additional saved for each gallon of ethanol produced.

Whereas specific exemplary embodiments are described and illustrated, it will be appreciated that the invention is not so limited.

Rather, the invention should be understood as advantageous in the context of any application wherein there exists:
a use for positive pressure steam; and
a moist flue gas The flue gas should have a minimum moisture content of about 12 wt. %; at concentrations significantly below this, the energy associated with the latent heat of the contained water vapor will normally be insufficient to maintain the temperature of the absorber at 220° F., and below this temperature, useful steam heat will not normally be available.

Persons of ordinary skill will readily appreciate the manner in which the invention can be deployed in other applications and accordingly, a detailed description is neither required nor provided. However, it will be appreciated that, at elevated temperatures, absorption capacity of LiBr brine falls off; accordingly, it will be expected that the stripping absorption module will normally be designed to operate in the 220-300° F. range. As well, LiBr brine has a tendency to crystallize at elevated concentrations, which could cause facility damage; for this reason, the strong brine will normally be designed to enter the SAM at no higher than 70 wt. % LiBr.

By adjusting the flow rate of the brine, the equilibrium temperature of the strong brine at the top of the absorber and the equilibrium temperature at the bottom of the absorber can be the same and the temperature of the brine as it passes through the absorber can be substantially constant, i.e. within about 2 F. Without intending to be bound by theory, it is believed that this has advantage in terms of heat exchange efficiency, as heat exchangers in general are most efficient use under constant temperature differential conditions.

The invention claimed is:

1. A process for use with a flue gas having a moisture content M, the process comprising the steps of:
   i. simultaneously
      introducing said flue gas to a flow of strong brine adapted to exothermically absorb moisture from the flue gas to produce heat; and
      withdrawing heat,
      thereby to produce a flow of heat, a flow of water-enriched brine and a gas having a moisture concentration less than M; and
   ii. recovering the strong brine from the water-enriched brine to produce a flow of water, characterized in that
   a. the temperature of the brine throughout the absorption step remains within 220 F. of a temperature T that lies in the range 220° F.-300° F.; and/or
   b. the withdrawal of heat is associated with the phase change of a working fluid from the liquid state to a gaseous state; the terminus of the heat flow is associated with the phase change of the working fluid from the gaseous state to the liquid state; in the liquid state, the working fluid flows only by one or more of gravity, convection and wicking; and in the gaseous state, the working fluid flows only by one or more of diffusion and convection; and/or
   c. the flow of heat directly drives a boiler to produce positive pressure steam; and/or
   d. M is greater than 15 wt. % water; and/or
   e. the strong brine is recovered through multiple-effect distillation of the water-enriched brine.

2. A process according to claim 1, characterized in that the temperature of the brine throughout the absorption step remains within 2° F. of the temperature T.

3. A process according to claim 1, characterized in that: the withdrawal of heat is associated with the phase change of a working fluid from the liquid state to a gaseous state; the terminus of the heat flow is associated with the phase change of the working fluid from the gaseous state to the liquid state; in the liquid state, the working fluid flows only by one or more of gravity, convection and wicking; and in the gaseous state, the working fluid flows only by one or more of diffusion and convection.

4. A process according to claim 1, characterized in the flow of heat directly drives a boiler to produce positive pressure steam.

5. A process according to claim 1, characterized in M is greater than 15 wt. % water.

6. A process according to claim 1, characterized in the strong brine is recovered through multiple-effect distillation of the water-enriched brine.

7. A process according to claim 3, wherein the working fluid is contained within a plurality of heat pipes.

8. A process according to claim 7, wherein the heat pipes operate in use as a packed absorption column.

9. A process according to claim 1, wherein the water-enriched brine is in vapor-liquid equilibrium with the flue gas.

10. A process according to claim 1, wherein the brine is in vapor-liquid equilibrium with gas having a moisture content less than M.

11. Use of the process of claim 1 with a flue gas that originates from a dried distiller grain solubles dryer.

12. Use of the process of claim 1 with a flue gas that originates from a dried distiller grain solubles dryer and is delivered via a thermal oxidizer.

13. Apparatus for use with a flue gas, a supply of liquid and a flow of strong brine adapted to exothermically absorb moisture from the flue gas to produce heat, the apparatus comprising:
   a flue;
   a vessel which, in use, receives liquid from said supply and which has an interior including a headspace, the vessel being disposed within the flue in a spaced relation to define a flow channel between the vessel and the flue and through which the flue gas passes in use;
   a distributor which, in use, receives the strong brine and channels same to the flow channel;
   a plurality of heat pipes each leading between the flow channel and the interior of the vessel, the surfaces of the heat pipes operating in use as packing in a packed absorption column, thereby to facilitate the absorption of moisture from the flue gas and the generation of heat, the heat pipes further withdrawing heat from the flow channel and delivering same to the liquid in the vessel to produce gas;

a conduit for venting the gas from the headspace of the vessel;

a collector for collecting the weak brine; and a regenerator for receiving the water-enriched brine to regenerate the strong brine and produce the flow of water.

14. Apparatus according to claim 13, wherein the collector is defined by a reservoir and the flue includes a stack extending vertically from the collector, the stack being defined by an annular wall having an inlet defined therethrough for receiving the flue gas.

15. Apparatus according to claim 14, wherein the vessel is an obround with vertical sides and is disposed in concentric relation to the stack.

16. Apparatus according to claim 13, wherein the plurality of heat pipes are arranged in layers, the heat pipes in each layer collectively defining a grid.

17. Apparatus according to claim 16, wherein each heat pipe has the shape of an ogee.

18. Apparatus according to claim 16, wherein each grid has the shape of a frustum of an onion dome, the onion dome being of the type having a bulbous lower part defined by a convex surface and an upper part having a concave surface that tapers to an apex, the horizontal planes defining the frustum lying, respectively, between widest part of the lower part and the transition of the lower and upper parts; and between the transition of the lower and upper parts and the apex.

19. Apparatus according to claim 17, wherein the vessel projects above and below the heat plurality of heat pipes.

* * * * *